(12) United States Patent
Jin et al.

(10) Patent No.: US 10,429,819 B2
(45) Date of Patent: Oct. 1, 2019

(54) FASTENING DEVICE AND FASTENING METHOD

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Chun-Xu Jin, Shenzhen (CN); Ting-Hui Deng, Shenzhen (CN); Long-Fong Chen, New Taipei (TW)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 313 days.

(21) Appl. No.: 15/408,596

(22) Filed: Jan. 18, 2017

(65) Prior Publication Data
US 2017/0343985 A1    Nov. 30, 2017

(30) Foreign Application Priority Data

May 27, 2016   (CN) .......................... 2016 1 0360190

(51) Int. Cl.
*G05B 19/4093*   (2006.01)
*F16B 5/02*   (2006.01)
*B25J 9/16*   (2006.01)

(52) U.S. Cl.
CPC ...... *G05B 19/40937* (2013.01); *B25J 9/1687* (2013.01); *F16B 5/02* (2013.01);
(Continued)

(58) Field of Classification Search
CPC ..... G05B 2219/40032; G05B 19/40937; B25J 9/1687
See application file for complete search history.

(56) References Cited

U.S. PATENT DOCUMENTS

| | | | | |
|---|---|---|---|---|
| 2012/0067176 | A1* | 3/2012 | Ota | B23P 19/006 81/57.37 |
| 2013/0340573 | A1* | 12/2013 | Lee | B23P 19/06 81/57.37 |
| 2017/0106509 | A1* | 4/2017 | Huang | B25B 23/147 |

OTHER PUBLICATIONS

Jim Camillo, Sensors: Guided Assembly, Assembly Magazine, https://www.assennblynnag.conn/articles/88033-sensors-guided-assembly (Year: 2010).*

(Continued)

*Primary Examiner* — Moshe Wilensky
*Assistant Examiner* — Kyle A Cook
(74) *Attorney, Agent, or Firm* — ScienBiziP, P.C.

(57) ABSTRACT

A device with a processing unit and a storage device also has a base, a cover including a plurality of guiding holes, a plurality of receiving members, an installation member, a plurality of first sensing devices, and a plurality of second sensing devices. The processing unit determines by a specific one of the first sensing devices corresponding to a specific one of the receiving members that the installation member is to acquire a fastening element from the specific receiving member. Then, the processing unit determines by a specific one of the second sensing devices corresponding to a specific one of the guiding holes that the installation member is to move towards the specific guiding hole. The processing unit controls the installation member to fasten the fastening element to an electronic device through the specific guiding hole when the specific first sensing device corresponds to the specific second sensing device.

5 Claims, 4 Drawing Sheets

(52) U.S. Cl.
CPC .............. *G05B 2219/39026* (2013.01); *G05B 2219/40032* (2013.01); *Y02P 90/265* (2015.11)

(56) References Cited

OTHER PUBLICATIONS

Karthick Dharmaraj, Automated Freeform Assembly of Threaded Fasteners, Loughborough University (Year: 2015).*
Leonard Rusli & Anthony Luscher, Fastener identification and assembly verification via IR tracking, Assembly Automation, vol. 32 Issue 3, pp. 262-275 (Year: 2012).*

* cited by examiner

FASTENING DEVICE AND FASTENING METHOD

CROSS-REFERENCE TO RELATED APPLICATIONS

This application claims priority to Chinese Patent Application No. 201610360190.7 filed on May 27, 2016, the contents of which are incorporated by reference herein.

FIELD

The subject matter herein generally relates to fastening device and fastening method.

BACKGROUND

In the assembly process, screws are common pieces to fasten units or components on the electronic devices. However, most of screw fastening processes are manually controlled. When an operator fastens the electronic device with different kinds of screws in the same workstation, errors may occur due to mismatch between the screw and screw holes. Thus, the yield rate in the assembly process may decrease.

BRIEF DESCRIPTION OF THE DRAWINGS

Implementations of the present disclosure will now be described, by way of example only, with reference to the attached figures.

DETAILED DESCRIPTION

Figure 1:
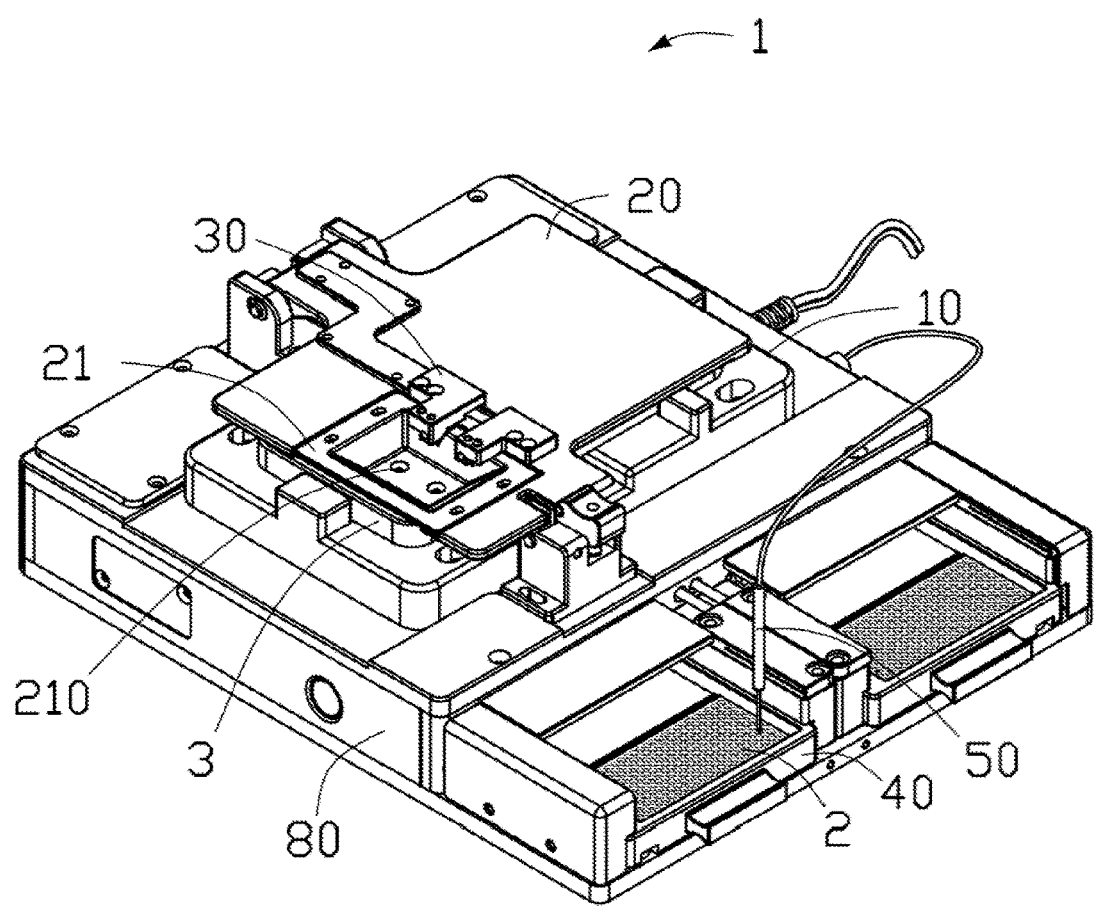
FIG. 1 is a schematic illustration of one exemplary embodiment of a fastening device.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. The drawings are not necessarily to scale and the proportions of certain parts can be exaggerated to better illustrate details and features. The description is not to be considered as limiting the scope of the exemplary embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

FIG. 1 illustrates an exemplary embodiment of a fastening device 1. In at least one exemplary embodiment, the fastening device 1 is used to prevent a fastening element 2 from fastening to an electronic device 3 at an incorrect position. In at least one exemplary embodiment, the fastening element 2 can be a screw, an antenna, or other electronic elements. In the exemplary embodiment, the fastening device 1 can include a mounting member 10, a cover 20, a plurality of pilot members 30, a plurality of receiving members 40, and an installation member 50. FIG. 1 illustrates only one example of the fastening device 1, the fastening device 1 in other exemplary embodiments can include more or fewer components than illustrated, or have a different configuration of the various components.

Figure 2:
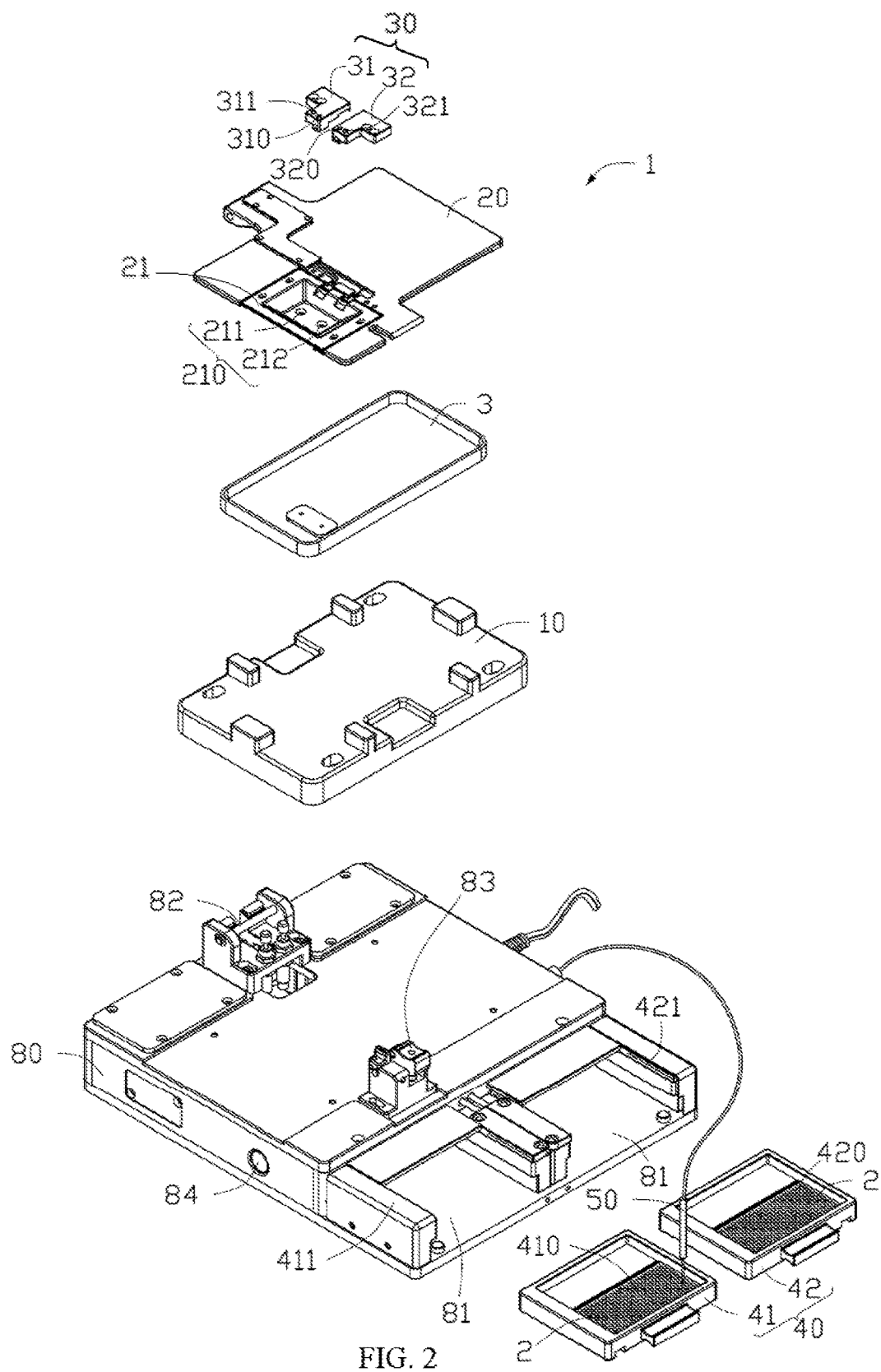
FIG. 2 is an exploded illustration of one exemplary embodiment of the fastening device of FIG. 1.

FIG. 2 is an exploded illustration of one exemplary embodiment of the fastening device of FIG. 1. In the exemplary embodiment, the electronic device 3 can be mounted on the mounting member 10, and the cover 20 can cover the mounting member 10. When the cover 20 covers the mounting member 10, the cover 20 can fix the electronic device 3 and prevent the electronic device 3 from damages during the fastening process. In at least one exemplary embodiment, the cover 20 includes a guiding member 21 having a plurality of guiding holes 210 on the guiding member 21. The fastening element 2 received in the receiving members 40 can be fastened to the electronic device 3 through the guiding holes 210. In the exemplary embodiment, the guiding holes 210 include a first guiding hole 211 and a second guiding hole 212. In the exemplary embodiment, a plurality of first sensing devices 411 and 421 are installed corresponding to the receiving members 40, and a plurality of second sensing devices 310 and 320 are installed corresponding to the guiding holes 210.

In at least one exemplary embodiment, the pilot members 30 are mounted to correspond to the guiding holes 210 on the cover 20. Each of the pilot members 30 corresponds to one of the guiding holes 210. In the exemplary embodiment, the pilot members 30 include a first pilot member 31 and a second pilot member 32. The first pilot member 31 is mounted on the cover 20 to correspond to the first guiding hole 211, and the second pilot member 32 is mounted on the cover 20 to correspond to the second guiding hole 212. The second sensing device 310 and a first pilot device 311 are installed on the first pilot member 31, and the second sensing device 320 and a second pilot device 321 are installed on the second pilot member 32. In at least one exemplary embodiment, one of the pilot devices 311 and 321 can provide a pilot signal when the installation member 50 is detected by one of the first sensing devices 411 and 421. In at least one exemplary embodiment, each of the pilot devices 311 and 321 is a light emitting diode (LED). Thus, the LED can be turned on to emit light and provide a pilot signal. The emitted light can be regarded as the pilot signal. In at least one exemplary embodiment, the color of the first pilot LED 311 can be identical to that of the second pilot LED 321. In at least one exemplary embodiment, the color of the first pilot LED 311 can be different from that of the second pilot LED 321.

In at least one exemplary embodiment, the receiving members 40 can receive a plurality of fastening elements 2. In at least one exemplary embodiment, the receiving members 40 can include a first receiving member 41 and a second receiving member 42. The first receiving member 41 includes a plurality of first receiving recesses 410, and the second receiving member 42 includes a plurality of second receiving recesses 420. Each of the first receiving recesses 410 and the second receiving recesses 420 can receive a fastening member 2. In at least one exemplary embodiment, the fastening members 2 received in the first receiving recesses 410 can be different from the fastening members 2 received in the second receiving recesses 420. In at least one exemplary embodiment, the first sensing device 411 can be installed corresponding to the first receiving member 41, and the first sensing device 421 can be installed corresponding to the second receiving member 42. In at least one exemplary embodiment, each of the receiving members 40 corresponds to one of the guiding holes 210. The fastening element 2 received in the receiving members 40 is fastened to the electronic device 3 through a corresponding guiding hole 210.

In at least one exemplary embodiment, the installation member 50 can acquire the fastening element 2 from the receiving members 40 and fasten the fastening elements 2 to the electronic device 3. Each fastening element 2 is fastened though one of the guiding holes 210. In at least one exemplary embodiment, the first sensing devices 411 and 421 and the second sensing devices 310 and 320 can detect the installation member 50. In at least one exemplary embodiment, the installation member 50 can be an electric screwdriver to fasten screws to the electronic device 3. In at least one exemplary embodiment, the installation member 50 can be a pneumatic screwdriver or other devices to fasten a screw, an antenna or other components to the electronic device 3.

Figure 3:
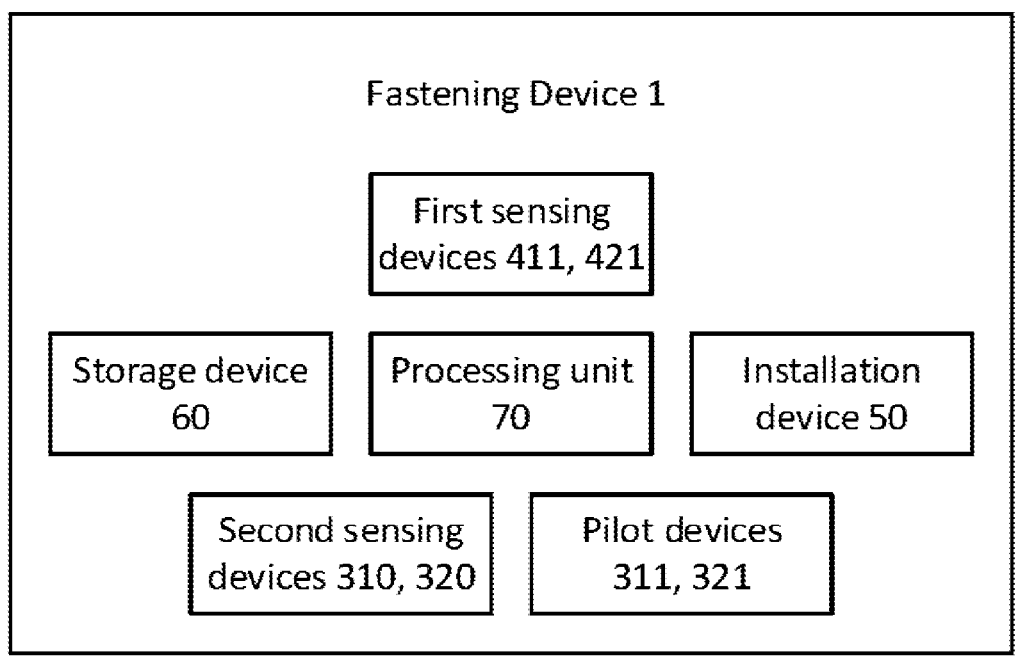
FIG. 3 is a block diagram of one exemplary embodiment of the fastening device of FIG. 1.

FIG. 3 is a block diagram of one exemplary embodiment of the fastening device 1 of FIG. 1. In the exemplary embodiment, the fastening device 1 can further include a storage device 60, and a processing unit 70. The second sensing devices 310 and 320, the pilot devices 311 and 321, the first sensing devices 411 and 421, the installation member 50, and the storage device 60 are electrically coupled to the processing unit 70. In at least one exemplary embodiment, the storage device 60 can be coupled to the processing unit 70 through a system bus. In the exemplary embodiment, the storage device 60 can store corresponding relationships between the receiving members 40 and the guiding holes 210.

In at least one exemplary embodiment, the storage device 60 can be a non-volatile computer readable storage media that can be electrically erased and reprogrammed, such as read-only memory (ROM), random-access memory (RAM), erasable programmable ROM (EPROM), electrically EPROM (EEPROM), hard disk, solid state drive, or other forms of electronic, electromagnetic, or optical recording media. In at least one exemplary embodiment, the storage device 60 can include interfaces that can enable access to the aforementioned computer readable storage media to enable the fastening device 1 to connect to and access such computer readable storage media. In another exemplary embodiment, the storage device 60 can include network accessing device to enable the fastening device 1 to connect and access data stored in a remote server or a network-attached storage.

In at least one exemplary embodiment, the processing unit 70 can be a processor, a central processing unit (CPU), a graphic processing unit (GPU), a system on chip (SoC), a field-programmable gate array (FPGA), or a controller for executing the program instruction in the storage device 60. The processing unit 70 can further include an embedded system or an application specific integrated circuit (ASIC) having embedded program instructions.

In at least one exemplary embodiment, when the installation member 50 acquires the fastening element 2 from the receiving members 40, the first sensing devices 411 and 421 corresponding to the receiving members 40 can detect the installation member 50 and provide detection to the processing unit 70. When the installation member 50 fastens the fastening element 2 to the electronic device 3, the second sensing devices 310 and 320 corresponding to the guiding holes 210 can detect the installation member 50 and provide detection to the processing unit 70.

In at least one exemplary embodiment, when the installation member 50 is detected by a specific one of the first sensing devices and a specific one of the second sensing devices, the processing unit 70 determines whether a specific one of the receiving members 40 corresponding to the specific first sensing device corresponds to a specific one of the guiding holes 210 corresponding to the specific second sensing device based on the corresponding relationship stored in the storage device 60.

In at least one exemplary embodiment, when the specific receiving member is determined to correspond to the specific guiding hole, the processing unit 70 can control the installation member 50 to fasten the fastening element 2. For example, the processing unit 70 can determine that the installation member 50 acquires a fastening element 2 from the first receiving member 41 and moves towards the first guiding hole 211 if the installation member 50 is sequentially detected by the first sensing device 411 and the second sensing device 310. Then, the processing unit 70 can determine that the position from which the fastening element 2 is acquired is the first receiving member 41 based on detection of the first sensing device 411 and that the position through the fastening element 2 will be fastened is the first guiding hole 211 based on detection of the second sensing device 310. Since the first receiving member 41 corresponding to the first sensing device 411 is determined to correspond to the first guiding hole 211 corresponding to the second sensing device 310 based on the corresponding relationships, the processing unit 70 controls the installation member 50 to fasten the fastening element 2 acquired from the first receiving member 41 to the electronic device 3 through the first guiding hole 211. In at least one exemplary embodiment, the processing unit 70 can look up the corresponding relationships to determine the relationship between the first receiving member 41 and the first guiding hole 211.

In at least one exemplary embodiment, when the specific receiving member is determined to not correspond to the specific guiding hole, the processing unit 70 can stop the installation member 50 from fastening the fastening element 2. For example, the installation member 50 is sequentially detected by the first sensing device 421 and the second sensing device 310. Since the second receiving member 42 corresponding to the first sensing device 421 is determined to not correspond to the first guiding hole 211 corresponding to the second sensing device 310, the processing unit 70 stops the installation member 50 from fastening the fastening element 2. Thus, the fastening element 2 acquired from the second receiving member 42 cannot be fastened to the electronic device 3 through the first guiding hole 211.

In at least one exemplary embodiment, when the installation member 50 is detected by a specific one of the first sensing devices, the processing unit 70 can control a specific one of the pilot devices corresponding to the specific first sensing device to provide a pilot signal. For example, when the installation member 50 is detected by the first sensing device 411 corresponding to the first receiving member 41, the processing unit 70 can control the first pilot device 311 corresponding to the first guiding hole 211 to provide the pilot signal. Thus, the fastening element 2 can be fastened to the electronic device 3 through the first guiding hole 211 based on the pilot signal provided from the first pilot device 311.

In at least one exemplary embodiment, the electronic device 3 can include a plurality of fastening holes (not shown). The fastening elements 2 are fastened into the fastening holes of the electronic device 3 through the guiding holes. After the fastening elements 2 are fastened into all of the fastening holes of the electronic device 3, the cover 20 can be uncovered so that the electronic device 3 can be removed from the fastening device 1. For example, the electronic device 3 includes four fastening holes. After the four fastening holes are fastened into the four fastening holes of the electronic device 3 through four guiding holes of the cover 20, the processing unit 70 can determines that the fastening process of the electronic device 3 ends. Thus, the cover can be uncovered and the electronic device 3 can be removed from the fastening device 1.

In at least one exemplary embodiment, the fastening device 1 further includes a base 80 as shown in FIG. 2. The base 80 includes a plurality of receiving parts 81, a shaft 82, a locking member 83, and a button 84. The receiving parts 81 can receive the plurality of receiving members 40. The mounting member 10 is mounted on an upper surface of the base 80. The cover 20 can rotate about the shaft 82 to cover the mounting member 10. The locking member 83 can lock the cover 20. The base 80 can supply power to the fastening device 1 by pressing the button 84 to turn on the fastening device 1.

Figure 4:
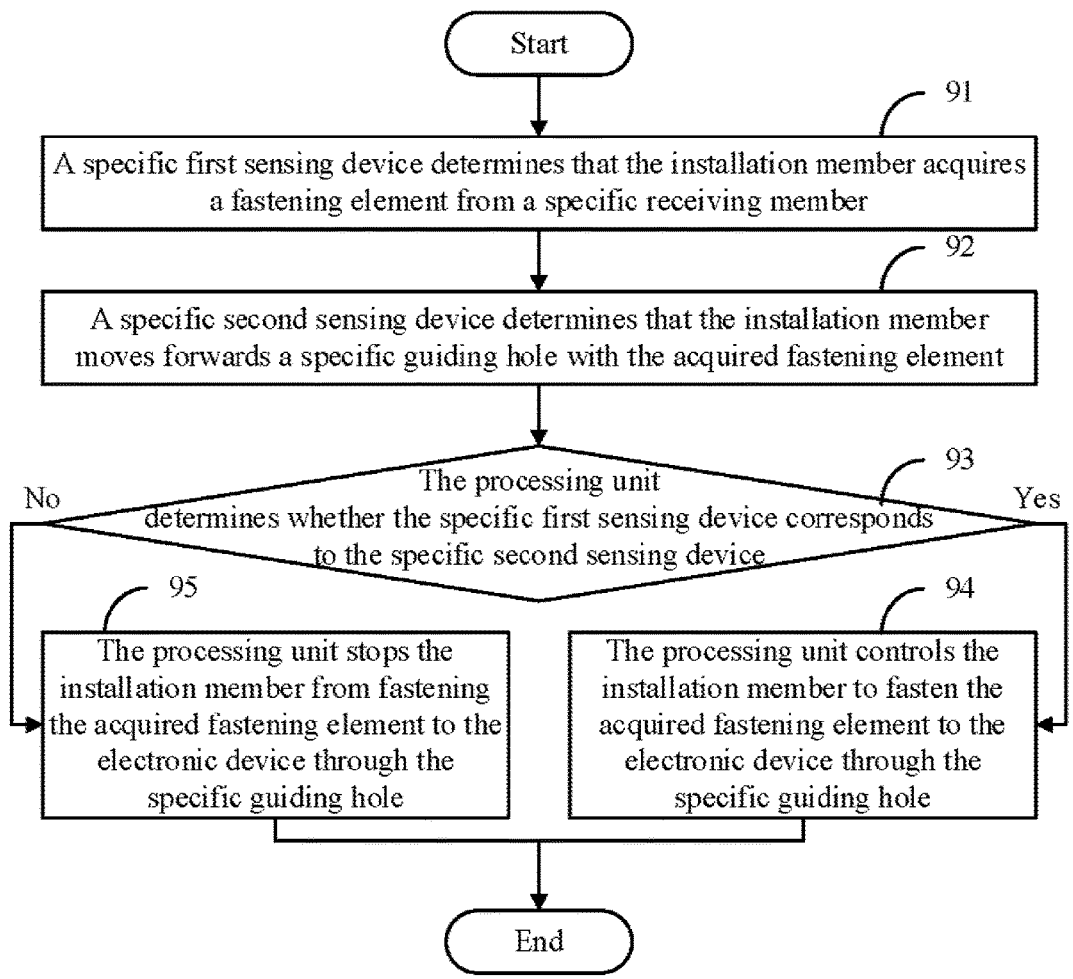
FIG. 4 is a flowchart of one exemplary embodiment of a fastening method for the fastening device of FIG. 1.

FIG. 4 illustrates a flowchart of an exemplary method. The exemplary method described below can be carried out using the configuration illustrated in FIGS. 1 and 3, for example, and various elements of these figures are referenced in explaining the exemplary method. Each block shown in FIG. 4 represents one or more processes, methods, or subroutines, carried out in the exemplary method. Furthermore, the order of blocks is provided only to illustrate the exemplary method and may be modified. Additional blocks can be added or fewer blocks can be utilized without departing from this disclosure. The exemplary method can begin at block 91.

At block 91, a specific first sensing device determines that the installation member 50 acquires a fastening element 2 from a specific receiving member 40.

In at least one exemplary embodiment, the first sensing devices 411 and 421 can detect the installation member 50 when the installation member 50 acquires the fastening element 2. If the installation member 50 acquires the fastening element 2 from the first receiving member 41, the first sensing device 411 can detect the installation member 50. If the installation member 50 acquires the fastening element 2 from the second receiving member 42, the first sensing device 421 can detect the installation member 50.

In at least one exemplary embodiment, the pilot devices can provide the pilot signal when the first sensing devices detect the installation member 50. If the first sensing device 411 detects the installation member 50, the first pilot device 311 can provide the pilot signal. If the first sensing device 421 detects the installation member 50, the second pilot device 321 can provide the pilot signal.

At block 92, a specific second sensing device determines that the installation member 50 moves towards a specific guiding hole 210 with the acquired fastening element 2.

In at least one exemplary embodiment, the second sensing devices can detect the installation member 50 when the installation member 50 moves towards the guiding holes with the acquired fastening element 2. If the installation member 50 moves towards the first guiding hole 211 with the acquired fastening element 2, the second sensing device 310 can detect the installation member 50. If the installation member 50 moves towards the second guiding hole 212 with the acquired fastening element 2, the second sensing device 320 can detect the installation member 50.

At block 93, the processing unit 70 determines whether the specific first sensing device corresponds to the specific second sensing device. If the specific first sensing device is determined to correspond to the specific second sensing device, the procedure goes to the block 94. If the specific first sensing device is determined to not correspond to the specific second sensing device, the procedure goes to the block 95.

In at least one exemplary embodiment, the first sensing device 411 corresponds to the first receiving member 41, and the second sensing device 310 corresponding to the first guiding hole 211. Thus, the first sensing device 411 is determined to correspond to the second sensing device 310 when the first receiving member 41 corresponds to the first guiding hole 211 based on the corresponding relationship stored in the storage device 60. In at least one exemplary embodiment, the first sensing device 421 corresponds to the second receiving member 42, and the second sensing device 320 corresponds to the second guiding hole 212. Thus, the first sensing device 421 is determined to correspond to the second sensing device 320 when the second receiving member 42 corresponds to the second guiding hole 212 based on the corresponding relationship stored in the storage device 60. In at least one exemplary embodiment, the processing unit 70 determines that the installation member 50 is detected by the first sensing device 411 and the second sensing device 310. Since the first receiving member 41 corresponding to the first sensing device 411 is determined to correspond to the first guiding hole 211 corresponding to the second sensing device 310 based on the corresponding relationship stored in the storage device 60, the processing unit 70 determines that the first sensing device 411 corresponds to the second sensing device 310. In at least one exemplary embodiment, the processing unit 70 determines that the installation member 50 is detected by the first sensing device 411 and the second sensing device 320. Since the first receiving member 41 corresponding to the first sensing device 411 is determined to not correspond to the second guiding hole 212 corresponding to the second sensing device 320 based on the corresponding relationship, the processing unit 70 determines that the first sensing device 411 is determined to not correspond to the second sensing device 320.

At block 94, the processing unit 70 controls the installation member 50 to fasten the acquired fastening member 2 to the electronic device 3 through the specific guiding hole.

In at least one exemplary embodiment, the fastening element 2 acquired from the specific receiving member corresponding to the specific first sensing device can be fastened through the specific guiding hole corresponding to the specific second sensing device when the specific first sensing device is determined to correspond to the specific second sensing device. For example, the installation member 50 acquires the fastening element 2 from the first receiving member 41, and then moves towards the first guiding hole 211 with the acquired fastening element 2. The processing unit 70 can control the installation member 50 to fasten the fastening member 2 acquired from the first receiving member 41 to the electronic device 3 through the first guiding hole 211 since the first receiving member 41 is determined to correspond to the first guiding hole 211.

At block 95, the processing unit 70 stops the installation member 50 from fastening the acquired fastening member 2 to the electronic device 3 through the specific guiding hole.

In at least one exemplary embodiment, the fastening element 2 acquired from the specific receiving member corresponding to the specific first sensing device cannot be fastened through the specific guiding hole corresponding to the specific second sensing device when the specific first sensing device is determined to not correspond to the specific second sensing device. For example, the installation member 50 acquires the fastening element 2 from the first receiving member 41, and then moves towards the second guiding hole 212 with the acquired fastening element 2. The processing unit 70 can stop the installation member 50 to prevent the fastening member 2 acquired from the first receiving member 41 from fastening to the electronic device 3 through second guiding hole 212 since the first receiving member 41 is determined to not correspond to the second guiding hole 212.

The exemplary embodiments shown and described above are only examples. Even though numerous characteristics and advantages of the present disclosure have been set forth in the foregoing description, together with details of the structure and function of the present disclosure, the disclosure is illustrative only, and changes can be made in the detail, including in matters of shape, size, and arrangement of the parts within the principles of the present disclosure, up to and including the full extent established by the broad general meaning of the terms used in the claims.

What is claimed is:

1. A fastening device, comprising:
   a base;
   a cover coupled to the base and comprising a plurality of guiding holes;
   a plurality of receiving members coupled to the base and configured to receive a plurality of fastening elements;
   an installation member coupled to the base and configured to fasten a specific one of the fastening elements to an electronic device;
   a plurality of first sensing devices, each first sensing device corresponding to one of the receiving members to detect the installation member,
   a plurality of second sensing devices, each second sensing device secured on the cover and corresponding to one of the guiding holes to detect the installation member; wherein each of the first sensing devices corresponds to at least one of the second sensing devices;
   a processing unit electrically coupled to the first sensing devices, the second sensing devices, and the installation member; and
   a storage device; wherein the storage device is coupled to the processing unit and stores a plurality of instructions, when the instructions are executed by the processing unit, the processing unit:
   determines, by a specific one of the first sensing devices corresponding to a specific one of the receiving members, the installation member is to acquire the specific fastening element from the specific receiving member;
   determines, by a specific one of the second sensing devices corresponding to a specific one of the guiding holes, the installation member is to move towards the specific guiding hole; and
   controls the installation member to fasten the specific fastening element to the electronic device through the specific guiding hole when the specific first sensing device corresponds to the specific second sensing device.

2. The device of claim 1, wherein the storage device further comprises instructions, when the instructions are executed by the processing unit, the processing unit:
   controls the installation member to stop fastening the specific fastening element to the electronic device through the specific guiding hole when the specific first sensing device is determined to not correspond to the specific second sensing device.

3. The device of claim 1, further comprising:
   a plurality of pilot members configured on the cover; wherein each of the pilot members is installed corresponding to one of the guiding holes, and each of the second sensing devices is installed on one of the pilot members.

4. The device of claim 3, further comprising:
   a plurality of pilot devices, each pilot device installed on one of the pilot members; wherein a specific one of the pilot devices corresponding to the specific second sensing device provides a pilot signal when the specific first sensing device corresponding to the specific second sensing device detects the installation member.

5. The device of claim 1, further comprising:
   a mounting member coupled to the base and configured to mount the electronic device;
   a plurality of receiving parts configured in the base and each receiving part receiving one of the receiving members;
   a shaft coupled to the base; wherein the cover rotates about the shaft to cover the mounting member; and
   a locking member coupled to the base and configured to lock the cover when the cover covers the mounting member.

* * * * *